といった

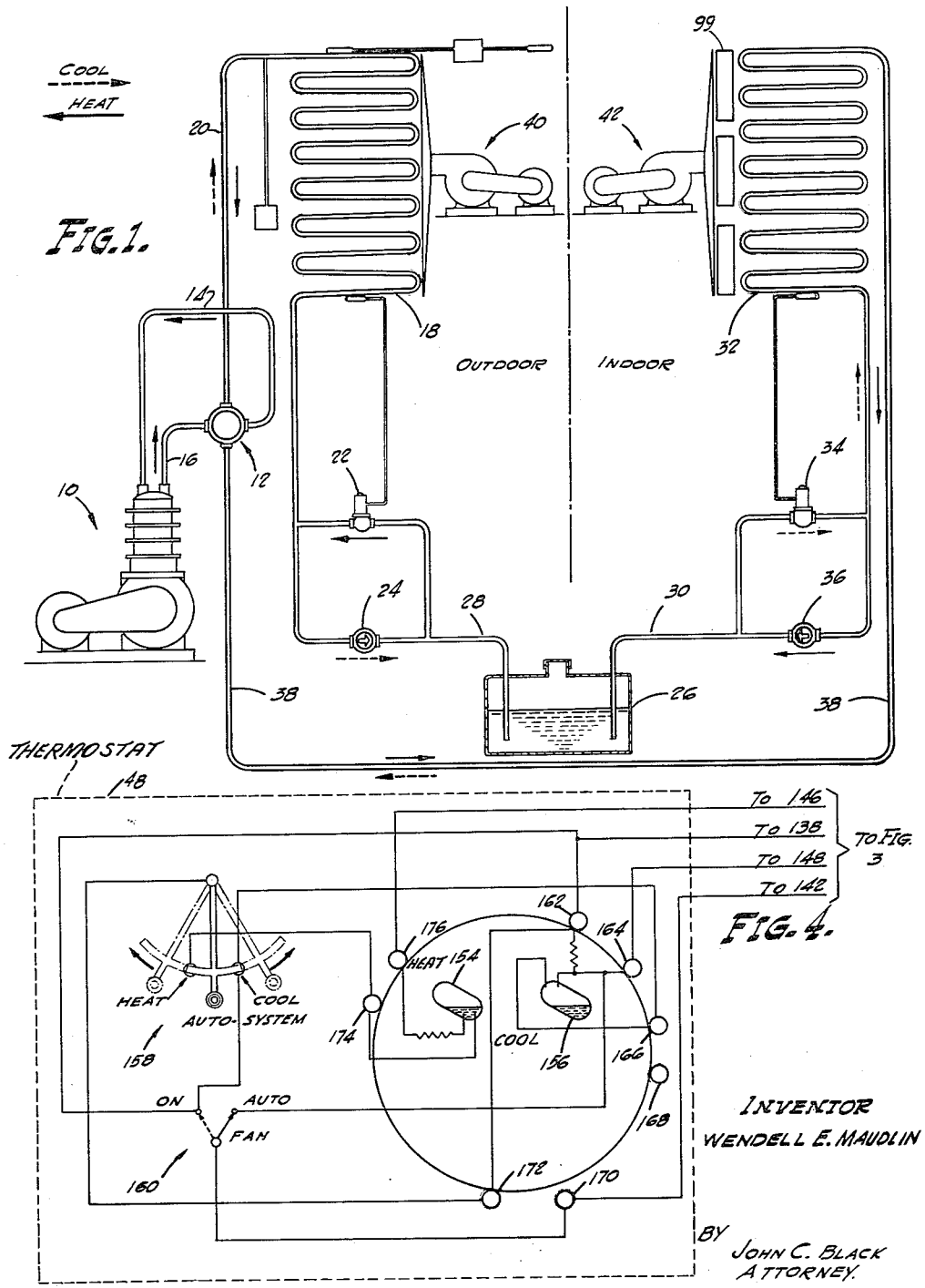

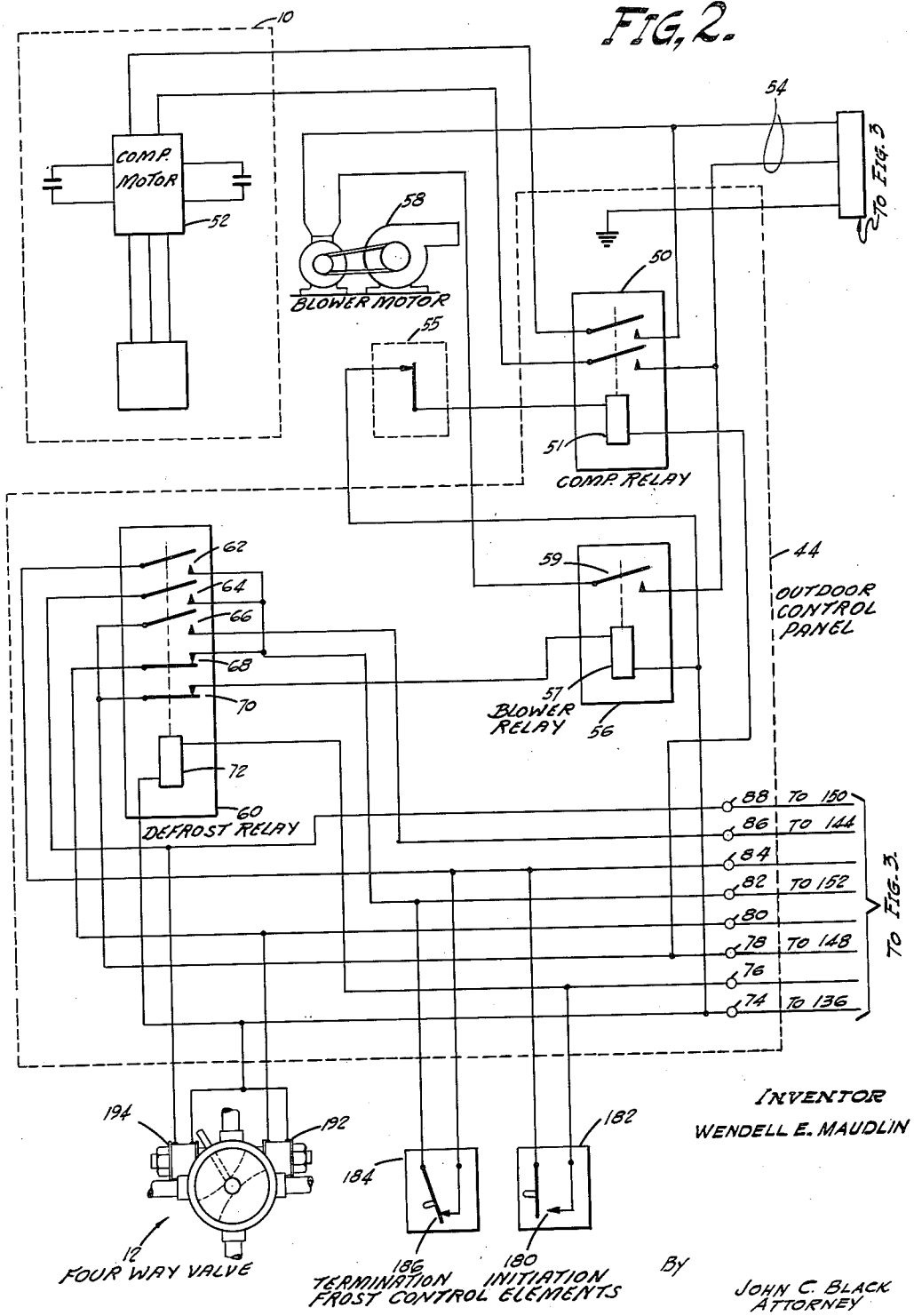

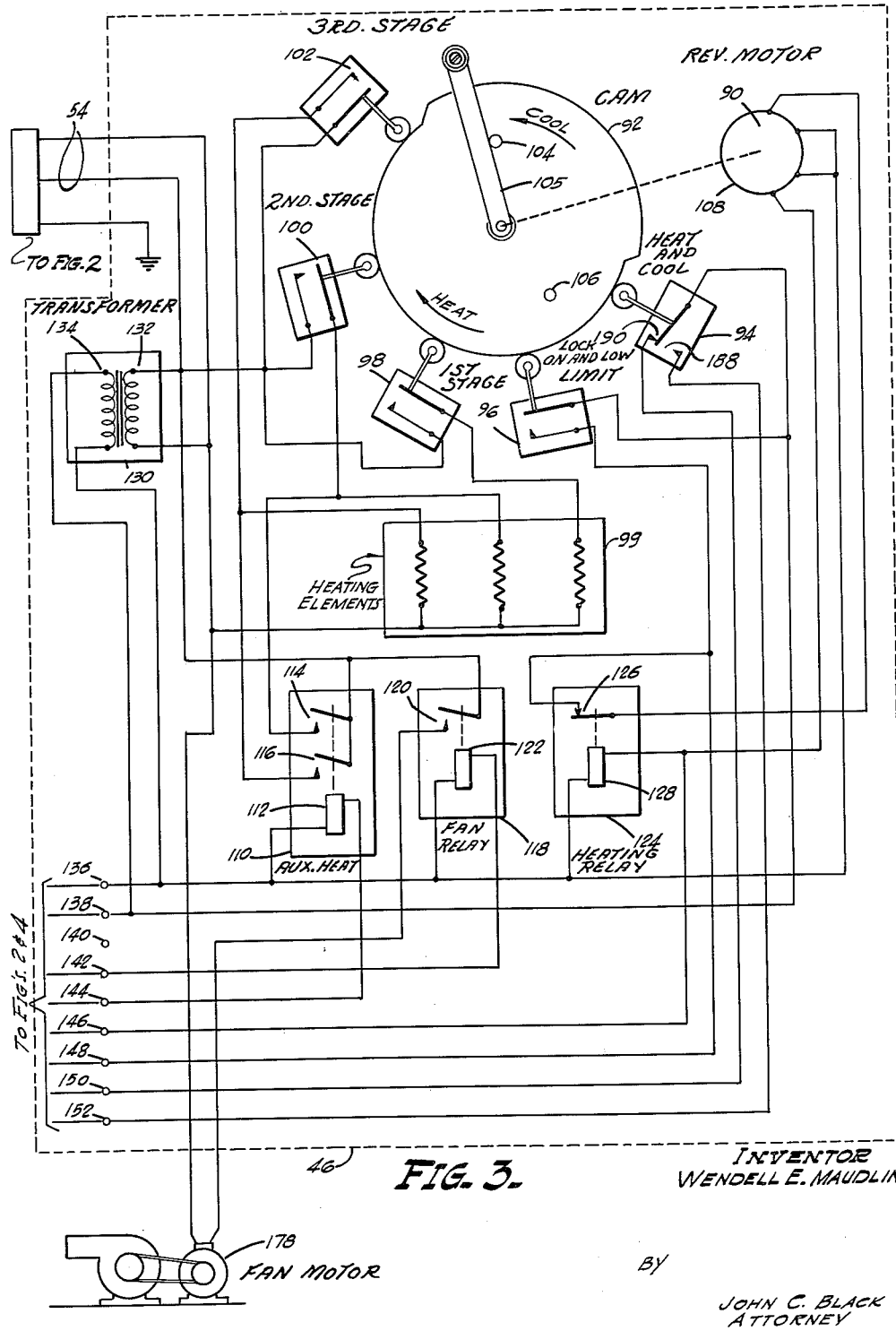

United States Patent Office 3,058,724
Patented Oct. 16, 1962

3,058,724
AUTOMATIC TEMPERATURE CONTROL SYSTEM
Wendell E. Maudlin, Lebanon, Ind., assignor to Stewart-Warner Corporation, Chicago, Ill., a corporation of Virginia
Filed June 16, 1959, Ser. No. 820,674
9 Claims. (Cl. 257—278)

This invention relates to an automatic temperature control system for an enclosure, and more particularly, to an automatic step-modulated control system for a reversible air conditioning apparatus known as a heat pump.

There has been a considerable amount of research conducted in the refrigeration and heating field to develop a combination heating and refrigeration apparatus which will operate efficiently and with great reliability to effect instantaneous heating or cooling of commercial or domestic buildings. This research has resulted in the development of a reversible refrigeration unit which s known in the industry as a heat-pump. Since the unit must operate efficiently regardless of the change in weather conditions, the output of the unit must be continuously varied to meet demand changes of either short or long duration. To meet these conditions, especially where the heat pump has been unable to supply the necessary heat during the heating cycle to maintain a satisfactory temperature within the enclosure from the comfort standpoint, there have been provided in the past a number of auxiliary heaters such as heaters of the electrical resistance type, which have been energized whenever the outside temperature was low enough to require such additional heat. While the addition of such auxiliary heaters allowed the temperature of the enclosure to be raised sufficiently to provide the comfort required, the known systems suffer from two main disadvantages. One disadvantage is that the inclusion of the auxiliary heaters mean the additional requirement of involved complex control systems employing indoor and outdoor thermostats for sequentially energizing the various auxiliary heaters at pre-selected temperatures occurring both within and without the enclosure. Another disadvantage is that even where a relatively simple control apparatus is provided for automatically changing the heat pump from a cooling to a heating cycle as well as sequentially energizing the auxiliary heaters, the output of the system was usually such that it would override the demand and provide heat greatly in excess of that required to obtain optimum comfort conditions within the conditioned structure. In effect, the auxiliary heaters were often turned on when in reality the heat pump could itself carry the heating load, thus supplying excessive heat when it was not needed.

It is therefore an object of this invention to provide an automatic control system wherein the control system is constantly striving to provide an optimum balance between the heat input and the heat lost from the enclosure being heated.

It is a further object of this invention to provide an improved automatic control system for a heat pump which is adapted to condition the air within the enclosure in step-modulated manner.

It is another object of this invention to provide an improved automatic control system for a heat pump wherein a plurality of auxiliary heaters may be energized in a sequential manner to supply instantaneously the amount of heat required by the enclosure regardless of changes in weather conditions.

It is a further object of this invention to provide an automatic control system for a heat pump which requires but a single thermostat located within the enclosure to be conditioned.

It is a further object of this invention to provide an improved automatic control system for a heat pump in which the droop characteristic of the system remains the same regardless of whether the apparatus is operating in mild weather or extremely cold weather.

It is a further object of this invention to provide an improved automatic control system for a heat pump including automatic defrost operation while insuring that sufficient heat will be supplied to the enclosure during the defrosting period.

Other objects of this invention will be pointed out in the following detailed description and claims and illustrated in the accompanying drawings which disclose by way of example the principle of this invention and the best mode which has been contemplated of applying that principle.

In the drawings:
FIGURE 1 is a schematic view of the heat pump embodying this invention;
FIGURE 2 is a schematic view of the electrical circuit associated with the outdoor control panel;
FIGURE 3 is a schematic view of the electrical circuit associated with the indoor control panel;
FIGURE 4 is a schematic view of the thermostat employed with the present automatic control system.

Briefly, the present invention comprises an automatic heating and cooling system for an enclosure having a plurality of independently energized electrical resistance heaters and a closed, reversible heat-pump refrigeration circuit including an indoor coil, an outdoor coil, a compressor, and a four-way valve for reversing the flow of refrigerant to the coils. The automatic control system includes a rotatable cam and means striving to constantly drive the cam in either of two directions. A plurality of switches are positioned adjacent the cam for sequential actuation to operate the heat pump and the electrical heaters. Thermostatic means are located within the enclosure for rotating the cam in a first direction to initiate the cooling cycle within the heat pump and in a second direction to first initiate a heating cycle within the heat pump and to subsequentially energize the independently operable electrical heaters in a predetermined sequential order. During operation, the thermostat acts continuously to reverse the rotation of the cam and thus strives to reach an equilibrium condition whereby the apparatus is operating on a fifty percent demand cycle.

In FIGURE 1, there is shown a schematic drawing of the heat pump employing the present automatic control system. This heat pump includes a compressor 10 whose function is to compress the low pressure refrigerant. The compressor 10 is connected to a four-way valve 12 by means of inlet conduit 14 and outlet conduit 16. The purpose of the four-way valve 12 is to direct the refrigerant flow between the elements of the system for accomplishing the heating and cooling cycles. An outdoor coil 18 is acting as a heat exchange structure between the refrigerant and the heat sink or heat source, depending on whether the equipment is operating on the cooling or heating cycle. The outdoor coil 18 is connected to the four-way valve 12 by means of conduit 20. The other end of the heating coil is connected to a thermostatic expansion valve 22 whose function is to reduce the refrigerant pressure, this valve 22 being in parallel with a check valve 24 to allow refrigerant flow to bypass the expansion valve 22 during the cooling cycle. A suitable storage reservoir 26 is used to store the liquid refrigerant and is connected to the expansion valve 22 and the check valve 24 by conduit 28. Conduit 30 connects the liquid refrigerant in reservoir 26 to an indoor coil 32. When the apparatus is operating on the cooling cycle, the liquid refrigerant will pass through a second thermostatic expansion valve 34 prior to entering the indoor coil 32. However, when operating on the heating cycle, the refrigerant bypasses the valve 34 through a check valve 36. Conduit 38 connects the other end of the indoor coil to the four-way valve 12 completing the closed circuit. The function of the indoor coil is to heat or cool an indoor air space depending upon whether the equipment is on a heating or cooling cycle. In order to insure proper heat exchange at both the outdoor and indoor coils, blower or fan 40 is positioned adjacent the outdoor coil 18, and blower or fan 42 is positioned indoors forcing media such as air over the indoor coil 32.

In operation during the heating cycle, the liquid refrigerant which is stored in reservoir 26 is of low heat content due to its being in a liquid state. The refrigerant, prior to entering the expansion valve 22, is under the high pressure portion of the system and the liquid refrigerant expands while passing through valve 22, at the same time picking up heat in passing through the outdoor coil 18. The coil due to the expansion will be at a temperature below that of the outdoor ambient and heat will be transferred from the heat source to the refrigerant within the coil 18. The refrigerant within coil 18 will be evaporated prior to its traveling through conduit 20 to the four-way valve 12 which directs its through conduit 14 to the suction side of the compressor 10. The refrigerant at this point is a low pressure gas. The compressor 10 compresses the gas to a high pressure and delivers it back to the four-way valve 12 through conduit 16 where it is directed through conduit 38 to the indoor coil 32. The refrigerant at this point is condensed in the indoor coil by losing heat to the indoor ambient air contacting the outer surfaces of the coil 32. In the process of losing heat to this indoor air, the refrigerant is condensed to a liquid and passes into conduit 30 through check valve 36, thereby returning to the reservoir 26. Specifically, the purpose of the expansion valve 22 is to reduce the pressure of the liquid refrigerant entering it, thereby reducing its boiling point to a point consistent with the pressure existing at the outlet of the valve. This boiling point will be below the temperature of the heat source media thereby allowing heat flow from the heat source media to the refrigerant within outdoor coil 18. Thereafter, the compressor 10 functions to increase the pressure of the refrigerant to a point which allows the room air circulated over the indoor coil 32 to condense the refrigerant prior to returning to the reservoir 26.

The system is operated in the reverse manner to effect a cooling cycle using all of the components used previously during the heating cycle, but with the refrigerant moving in the opposite direction. Thus, liquid refrigerant which is stored in reservoir 26, having relatively high pressure and being in the liquid state, travels to the expansion valve 34 where its pressure is reduced, as well as its boiling point, and enters the indoor coil 32. The media, such as air to be cooled, is passed over the indoor coil 32 by means of blower 42 where the air gives up its heat to the cold refrigerant as a result of the expansion, causing it to evaporate. The gaseous refrigerant leaves the indoor coil 32 in a gaseous state at low pressure and consequently high heat content where it travels to the four-way valve 12 through conduit 38 where it is directed to the suction side of compressor 10 through conduit 14. The refrigerant is then compressed to a high pressure and consequently a high boiling or condensation point and travels through outlet conduit 16 back to the four-way valve 12, through conduit 20 to the outdoor coil 18. At this point, the heat sink media which passes over the outdoor coil 18 picks up the heat in the gaseous refrigerant thereby causing it to condense back to a liquid. The liquid then travels through check valve 24 and conduit 28 back to the reservoir 26 where the process may be repeated.

The present invention is directed to an automatic control system which operates in response to changes in temperature of the air inside the building to be controlled. As such, the present system includes automatic means for changing from the heating cycle to the cooling cycle as well as means to provide additional heat from a plurality of sequentially energized electrical resistance heaters. In addition, the present invention includes automatic means for defrosting the outdoor coil in response to a build-up of an undesired amount of frost thereon. The control system comprises three basic control components; an outdoor control panel 44, an indoor control panel 46 and a thermostat 48.

The outdoor control panel 44 includes a solenoid operated contactor 50 for providing an electrical switching action to connect the compressor motor 52 across the high voltage line 54. In addition, the outdoor control panel 44 includes a fan relay 56 which provides the necessary switching action to energize an outdoor blower motor 58 which drives the outdoor blower 40 of FIG. 1. The outdoor control panel 44 further includes a defrost relay 60 which provides the necessary switching action required to initiate the defrost cycle. The defrost relay 60 includes a number of normally open contacts indicated at 62, 64 and 66 and a pair of normally closed contacts, 68 and 70, which are closed and opened respectively by energization of defrost relay coil 72. The outdoor control panel 44 further includes a number of electrical connecting points or terminals 74, 76, 78, 80, 82, 84, 86 and 88 which allow the individual elements of the outdoor control panel to be connected to the other elements making up the control system.

The second main component of the control system comprises an indoor control panel 46 located within the enclosure to be cooled or heated and includes a reversible clock motor 90 of the synchronous-type which is adapted to drive cam 92 in either a clockwise or counterclockwise direction. Associated with the rotating cam 92 is a first cam-operated relay switch 94 which provides a switching action to change the four-way valve 12 from the heat and cool position or vice versa. A second cam-operated switch 96 is positioned next to the heat and cool switch 94 and may be actuated to provide a switching action to close contactor 50 on the outdoor control panel 44 to start the compressor motor 52 while also providing the function of electrically limiting the counterclockwise rotation of the cam 92 during the heating cycle. A third cam-operated switch 98 is positioned adjacent switch 96 and is actuated to provide a switching action to complete a current path to the first stage of a three-stage electric resistance heater 99. A second stage electric resistance heating switch 100 is also operated by cam 92 as well as a third stage cam-operated switch 102. The switches are actuated by the cam 92 as it rotates in a clockwise direction to energize the second and third stage electrical resistance heaters in a sequential or progressive manner. All of the cam-operated, mechanical switches 94, 96, 98, 100 and 102 are normally biased in the off position such that rotation of the cam in a clockwise direction will close the normally open switches while reversal of rotation of the cam will allow the biased switches to return to the open position. The rotating cam also includes a pair of stops 104 and 106 which cooperate with fixed arm 105 and are so positioned upon the moving cam as to prevent or to limit rotation of the cam in either the clockwise or counterclockwise direction in response to frictional engagement of a clock motor drive disc 108.

In addition to the constantly rotating cam for automatically controlling the operation of the elements making up the system, the indoor control panel 46 also includes an auxiliary heat relay 110 which includes a relay coil 112 and a pair of normally open contacts 114 and 116. This auxiliary heat relay 110 provides the necessary switching action to energize the auxiliary resistance heater during the defrost cycle. A fan relay 118 is also included on the indoor control panel 46 and includes a single pair of normally open contacts 120 and a relay coil 122; the purpose of this fan relay being to provide the switching action required to energize an indoor blower motor 178. A heating relay 124 is included on the indoor panel 46 for providing the switching action required to rotate cam 92 in a counterclockwise direction when the heating thermostat is satisfied. As such, the heating relay 124 includes a pair of normally closed contacts 126 and a heating relay coil 128. Also associated with the indoor control panel 46 is a transformer 130 which includes a high voltage primary winding 132 of approximately 230 volts and a 24-volt secondary winding 134. The present system makes advantageous use of only low voltage connections between the various components of the control system. In a manner similar to the outdoor control panel 44, the indoor control panel 46 includes a plurality of terminals or connecting points 136, 138, 140, 142, 144, 146, 148, 150 and 152 which allow the various elements of the indoor control panel to be connected to each other, and to additional elements making up the control system.

The third main component of the system comprises a thermostat 48 which is located in the area in which the temperatures are to be maintained. The thermostat 48 includes two switches 154 and 156 which are actuated by bimetal elements (not shown) which sense the room air temperature. The switches 154 and 156 themselves are of the normally open tiltable, liquid mercury type wherein rotation thereof causes the normally open switches to close. The switch 154 is closed when the thermostat is calling for heat, while the switch 156 is closed when the thermostat is calling for a cooling operation. The thermostat 48 further includes two manually operated switches 158 and 160. The manually operated switch 158 provides a switching action between three positions—that is, a heat position, an automatic position and a cooling position. The manually operated switch 160 provides a switching action allowing continuous fan operation at the "On" position, or cycling fan operation with heat pump operation when the switch is in the position marked "Automatic." Both switches 158 and 160 will be considered only when the switch is in the "Automatic" position as this invention lies in the automatic operation above. The thermostat 48 also includes a number of electrical circuit connecting terminals which are indicated at points 162, 164, 166, 168, 170, 172, 174 and 176.

In addition, the control system includes an indoor blower motor 178 which drives the blower 42 indicated in FIG. 1, and a defrost initiation control element 182 having a pair of normally open contact points 180 which close when it is desirable to defrost the outdoor coil 118. A defrost termination control 184 having a pair of normally closed contacts 186 operates to terminate the defrost cycle.

In this system all of the components are operated automatically, regardless of whether the thermostat is calling for a heating or a cooling cycle. In addition, the apparatus is designed to operate automatically to provide additional heating by means of the first, second and third stage electrical resistance heaters which are employed to assist in the normal heating function provided by the heat pump system. Automatic means are also employed to provide auxiliary heat in the form of the three-stage electrical heater 99 during the defrost cycle.

The operation of the system during the cooling cycle is as follows: Normally, the thermostat is regulated such that the manually operated switches 158 and 160 are positioned for automatic operation. Assuming that power is being supplied to the equipment, with thermostatic switches 154 and 156 being open, along with both switches 158 and 160 in the automatic position, the auxiliary heat switch 110 will be open and the indoor fan blower motor 178 is off since fan relay 118 is open while the heating relay 124 is de-energized and its contacts 126 are closed. The cam 92 is in the position shown in FIG. 3, with the cam operated switches 94, 96, 98, 100 and 102 in the off position. As such, the heat and cool cam operated switch 94, which is the single pole, double throw switch, is operating with switch contacts 188 open and switch contacts 190 closed. Under this arrangement, a circuit will be completed from terminal 138 on the indoor control panel, which is one side of the transformer secondary 134, through contacts 190 of the heat and cool cam operated switch 94, terminal 88 on the outdoor control panel 44, the cooling solenoid 192, terminal 74 on the outdoor control panel 44 and terminal 136 on the indoor control panel which is connected to the opposite side of the transformer secondary 134, thereby energizing the cooling solenoid 192 and positioning the four-way valve 12 in the cooling position. At the same time, the cam-operated switches 94, 96, 98, 100 and 102 are in the de-energized position as shown in FIG. 3. Relays 50, 56 and 60 are also de-energized, and the contacts of these relays are in the position shown in FIG. 2. As room temperature increases, the thermostatic switch 48 will operate to call for a cooling cycle whereby mercury switch 156 will close creating a closed electrical circuit from terminal 138 of the indoor control panel to terminal 162, switch 158, terminal 166, switch 156 and terminal 164 of the thermostat 48, terminal 148 of the indoor control panel, contacts 126 of the heating relay 124 which are closed, synchronous clock motor 90, and the opposite side of transformer secondary 134, thereby driving the cam 92 in a counterclockwise position until stop 104 has contacted the stationary projecting member 105, thereby preventing further counterclockwise rotation of the cam disc 92. In addition, a circuit is also completed from terminal 148 on the indoor control panel, through terminal 78 on the outdoor control panel, to the relay coil 51 of relay 50, through the closed contacts of the dual pressure control 55, terminal 74 on the outdoor control panel, terminal 136 of the indoor control panel which is connected to the opposite side of the secondary 134. This results in energization of contactor relay 50 closing its contacts and starting the compressor motor 52 of compresor 10. At the same time, a circuit is also completed from terminal 78 on the outdoor control panel through the closed contacts 70 of defrost relay 60 to coil 57 of the fan relay 56, terminal 74 of the outdoor control panel, terminal 136 of the indoor control panel and back to the secondary 134 of transformer 130 thereby closing the normally open contacts 59 of the fan relay and starting the outdoor blower motor 58 which is associated with the outdoor blower 40. Likewise, a circuit is also completed from terminal 172 on the thermostat 48 through switch 158 and 160, terminal 170 of thermostat 48, terminal 142 of the indoor control panel, coil 122 of fan relay 118, terminal 136 and the opposite side of transformer secondary 134 thereby energizing fan relay 118 closing the normally open contacts 120 and starting the indoor blower motor 178. With cam 92 in this position, the bimetal actuated mercury switch 156 will open and close upon change in the room temperature, thus causing the indoor blower motor 178, compressor motor 52, and outdoor blower motor 58 to cycle.

During automatic operation of the system to heat the room rather than cool it, the starting position will be essentially the same as on cooling. In this case, both bimetal thermostat switches 154 and 156 will be open. All of the components will be in the position shown in FIGS. 2 and 3. Upon the initial call for heating by movement of the bimetallic thermostatic switch, associated switch 154 will be closed and a circuit will be initiated from terminal 138 which is on one side of control transformer 130 secondary winding 134, through terminal 162, terminal 172, terminal 174, manually operated switch 158, the contacts of the mercury switch 154, and terminal 176 of thermostat 48, terminal 146 of the indoor control panel, relay coil 128 of the heating relay 124, and terminal 136 of the indoor control panel which is on the opposite side of the transformer secondary 134. In addition, a circuit will be completed to the clock motor 90 from terminal 146 to the opposite side of the secondary 134. The energy thus applied to the synchronous motor 90 will drive cam 92 in a clockwise direction. As the cam 92 rotates in a clockwise direction, the camming surface will contact the cam follower of the heat and cool switch 94 to open normally closed contacts 190 and close normally open contacts 188. This will complete a circuit from terminal 138 of the indoor control panel, through contacts 188 of the heat and cool switch 94 to terminal 152 of the indoor control panel, terminal 82 of the outdoor control panel 44, normally closed contacts 68 of defrost relay 60, terminal 80 of the outdoor control panel, heating solenoid 194, terminal 74 of the outdoor control panel, to terminal 136 of the indoor control panel and back to the other side of the transformer secondary 134, to position the four-way valve 12 into the heating position. As the cam continues its rotation, the lock-on and low limit cam operated switch 96 will be energized closing its normally open contacts. A circuit will therefore be completed from terminal 138, through switch 96, terminal 148, of the indoor control panel, terminal 78 of outdoor control panel, coil 51 of relay 50, through low pressure control contacts 55, terminal 74 of the outdoor control panel and to the opposite side of the transformer secondary 134 through terminal 136 of the indoor control panel. The normally open contacts of relay 50 will close starting the compressor motor 52. Simultaneously, power will be supplied from terminal 78 of the outdoor control panel through the normally closed contacts 70 of the defrost relay 60 to the fan relay coil 57, and back to the secondary 134 of the transformer through terminals 74 and 136. Energization of the fan relay coil 57 closes the normally open contacts 59 starting the outdoor blower motor 58. Power will also be supplied from terminal 148 of the indoor control panel, to terminal 164 of the thermostat, manually operated switch 160, terminal 170 of the thermostat 48, terminal 142 of the indoor control panel, coil 122 of fan 118 and back to the other side of the transformer secondary 134 thereby energizing the fan relay coil 122 of fan 118 closing the normally open contacts 120 and placing the indoor blower motor 178 across the line.

If the thermostatic switch 156 still calls for more heat, and the cam continues to rotate slowly in a clockwise direction, cam operated switch 98 will be energized to complete a circuit to the first stage of the resistance heating unit. Likewise, if the bimetal operated thermostatic switch 156 continues to call for more heat, the cam will continue to rotate in a clockwise direction thereby closing the second stage cam operated switch 100 and finally the third stage cam operated switch 102. However, in the actual operation and due to the spacing of the switches 96, 98, 100 and 102, the cam will establish a position which will have just under enough switches energized calling for heat to balance the heat load on the building and with the remaining amount of heat required being supplied by the cam pulsing back and forth across the next stage of heat in response to switch 156 action. In other words, one of the principal advantages of the present system is the provision of a modulated heat input which continuously operates to produce and exactly balance out the heat loss from the structure rather than conventional systems which provide a full capacity, on and off type operation.

For instance, at a given heat load on the building being supplied, the switch 154 will cycle "on" fifty percent of the time and "off" fifty percent of the time with the cam 92 having established a position which will supply an amount of heat to exactly balance the loss from the structure. If the heat load on the structure varies, for example, if it increases, the switch 154 will be closed a higher percentage of the time than it is open. This will cause the cam to rotate in a clockwise direction longer than in a counterclockwise direction and thereby in effect re-establish the position of the cam 92 to maintain a higher number of the switches 96, 98, 100 and 102 in the "on" position. The increases made, resulting from the new cam position, will in any case supply heat to the structure to bring the thermostat to a fifty percent "on," fifty percent "off" value and the system will again be in equilibrium. When the switch 154 is broken such as would happen if the adjustment on the thermostat was moved to a lower temperature position, relay coil 128 of relay 124 would be de-energized thus closing the normally closed contacts 126 and the synchronous motor will be driven in a counterclockwise direction. Switches 102, 100 and 98 will drop out if the cam is in this position along with lock-on and low limit switch 96 as the cam reaches this point in its counterclockwise rotation. This would open the normally open contacts of switch 96 which would break the circuit through switch 96, with relay 124 stopping the clock motor at a position intermediate of the cam operated switch 96 and cam operated switch 94. In addition, opening switch 96 would result in opening the fan relay 118 as well as the compressor contactor relay 50 and fan relay 56. Since the cam 92 has stopped in a position such that the contacts 188 of switch 94 are closed and contacts 190 are open, the four-way valve 12 will remain in the heating position. However, should the thermostat call for a cooling cycle, a circuit will be completed from terminal 138 through terminal 162, terminal 172, switch 158, terminal 166, switch 156, terminal 164, all on thermostat 48, terminal 148 on the indoor control panel through the heating relay 124 to the synchronous motor 90 and back to the other side of the control transformer 134 thereby driving the cam 92 against stop 104 and changing the heat and cool switch 94 wherein the normally open contacts 188 are now open and the normally closed contacts 190 are closed. Thus, a circuit will be completed to the cooling solenoid 192 changing the position of the four-way valve 12 as described previously to set up the cooling operation.

The present invention also incorporates automatic means for defrosting the outdoor coil 18 at a time when a predetermined thickness of frost is built up upon the coil. The only situation or condition under which a defrosting operation would be required is one when the thermostat has been calling for heat since it is only at this time that the outdoor coil will have a frost formation thereon. This automatic defrost cycle operates as follows. Assume that the cam 92 is between switches 96 and 98 and cycling back and forth, thereby operating the compressor motor 52, the outdoor blower motor 58, and indoor blower motor 178 as previously described. When the outdoor coil has a layer of frost which wants a defrost cycle, defrost initiation switch 182 will operate and contacts 180 of this switch will close. At this time, terminal 74 of the outdoor control panel 44 is deriving power from one side of the secondary 134 of transformer 130 while terminal 78 of the same outdoor control panel is deriving power through circuits previously mentioned from the other side of the control transformer 130. When defrost initiation switch 182 calls for a defrost cycle, it forms a circuit from terminal 74 through coil 72 of the defrost relay 60, terminal 76 of the outdoor control panel, defrost termination switch contacts 186 of defrost termination switch 184, which has its contacts in a normally closed position, terminal 84 of the outdoor control panel, defrost initiation switch 182, terminal 82 of the outdoor control panel 44, terminal 152 of the indoor control panel, switch contacts 188 of the heat and cool switch 94 to the opposite side of the control transformer secondary 134. As a result, the defrost relay coil 72 will be energized closing the normally open contacts 62, 64 and 66 and opening the normally closed contacts 68 and 70 of this relay. Relay 60 will be held in the energized position by a circuit which is completed from terminal 74 of the outdoor control panel, through the defrost relay coil 72, terminal 76, defrost termination switch contacts 186, terminal 84 of the outdoor control panel, defrost relay contacts 62, terminal 82 of the outdoor control panel, terminal 152 of the indoor control panel, closed contacts 188 of the heat and cool switch 94 and back to the other side of the control transformer secondary 134. At the same time, the outdoor fan relay 56 has its circuit broken, since contacts 70 of the defrost relay 60 are now open, thereby stopping the outdoor blower motor 58. A circuit is also completed from terminal 78 of the outdoor control panel, through contact 66 on the defrost relay 60, terminal 86 of the outdoor relay, terminal 144 of the indoor control panel, auxiliary heat relay coil 112 to the other side of the control transformer secondary 134. Completion of this circuit results in current being supplied on the second and third bank of the electrical resistance heaters. The purpose of this additional heat is to counterbalance the cooling action of the refrigeration cycle during the defrost cycle. In other words, while the thermostat 48 is really calling for additional heat to be supplied to the room, the operation of the defrost initiation switch 182 will result in a change from a heating cycle to the cooling cycle as far as the heat pump is concerned. It is therefore necessary to energize the various stages of the electrical resistance heating elements to provide sufficient heat within the room to overcome the cooling effect produced by the heat pump operation. As noted previously, a circuit is also completed through the cooling solenoid 192 by means of closed contacts 188 of the heat and cool cam operated switch 94 to energize the cooling solenoid 192. At this time, the heating solenoid 194 is open, since the defrost relay is energized, thus opening the normally closed relay contacts 68 of this relay. This simultaneous solenoid action thereby shifts the four-way valve 12 to the cooling position. During the defrost cycle, the system (FIG. 1) operates with the compressor 10 running, the outdoor blower 40 off, the inside blower 42 running and two stages of resistance heat (not shown) on with the refrigeration in the cooling cycle. Since the heat pump is on the cooling cycle, the outdoor coil will act as a condenser and thereby the hot coil causing its temperature to rise and melt away any ice and frost in the conventional manner. As the temperature of the outdoor coil 18 rises, there is a corresponding rise in pressure in the refrigeration circuit thereby actuating the defrost termination switch 184. The defrost termination switch is so adjusted that the switch will operate to open the normally closed contacts 186 when the pressure or corresponding temperature is of a value sufficient to insure that all the frost has been removed from the outdoor heating coil 18 during the defrost cycle. Opening of switch contacts 186 will break the holding circuit which is established through the switch contacts 186 of switch 184 and switch contacts 62 of the defrost relay 60. The defrost relay coil 72 is therefore de-energized, returning all circuits to the normally heating cycle.

It is evident from the above discussion, that the present automatic system provides an arrangement which will operate in all types of weather to supply heated or cooled air to the enclosure regardless of whether the system is operating in mild weather, warm weather or extremely cold weather. In addition, the system is designed to constantly seek an equilibrium position wherein it will always operate on a fifty percent "on," fifty percent "off" time schedule. The amount of heat supplied to the thermostat for anticipation will be the same no matter whether the outside temperatures are high or low. This is the reason for the essentially constant droop or change in control point of the thermostat produced by this control system. As mentioned previously, the system provides modulated heat input which constantly strives to exactly balance the heat loss from the structure rather than the conventional system which employs full capacity "on" or "off" type operation. As far as the structural features of the present control system, it is apparent that there is little need for exact positioning of any of the switches 94, 96, 98, 100 and 102 with respect to the rotating cam 92, since the cam is constantly moving in either of two directions to seek an equilibrium condition. In addition, the use of cam operated control switches provides a switching operation which is not subject to changes in the varying ambient temperatures surrounding the control panel. Since the cam is moving at a relatively slow speed, there is always a time delay between the imposed electrical loads, thereby reducing line surges which can produce light flickering and television picture shrinkage. In addition, should thermostatic jiggling occur, that is, a constant opening and closing of the thermostatic switches 154 and 156, the result of such jiggling will not operate to instantaneously reverse the system since the cam is being driven at a relatively slow speed and must therefore rotate for a corresponding long time to effect the change in position required to effect operation of any of the cam operated switches.

While there have been shown and described and pointed out fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an automatic heating and cooling system for an enclosure having at least one independently energized auxiliary heater positioned within said enclosure and a closed, reversible, heat pump refrigeration circuit including an indoor coil, an outdoor coil, a compressor and a four-way valve for reversing the flow of refrigerant to said coils, a control system comprising: a rotatable cam, a reversible motor to alternately drive said cam at a constant speed in either of two rotational directions independently of the temperature ambient the cam, a plurality of switches positioned adjacent said cam for sequential operation to operate said heat pump and said heater, thermostatic means located within said enclosure and electrically associated with said motor for controlling the direction of rotation of said cam, said cam rotating in a first direction to initiate a cooling cycle within said heat pump, and in a second direction to first initiate a heating cycle within said heat pump and subsequently to energize said independently operable heaters in a predetermined sequential order, said thermostatic means acting to constantly reverse the direction of rotation of said cam to effect a partial demand cycle regardless of weather conditions.

2. In an automatic heating and cooling system for an enclosure having a plurality of independently energized electrical heaters located therein and a closed, reversible, heat pump refrigeration circuit including an indoor coil, an outdoor coil, a compressor and a four-way valve for reversing the flow of refrigerant to said coils, a control system comprising: a rotatable cam, means tending to drive said cam at a constant speed in either of two rotational directions independently of the temperature ambient the cam, a plurality of cam actuated switches positioned adjacent said cam for sequential operation to operate said heat pump and said electrical heaters, a first thermostatic switch positioned within said enclosure and operable in one position to cause said cam to rotate in a first direction to initiate the heat pump cooling cycle, said switch operable in a second position to terminate said cooling cycle, a second thermostatic switch positioned within said enclosure and operable in one position to cause said cam to rotate in a second direction to first initiate a heating cycle within said heat pump and to subsequently energize said independently operable electrical heaters in a sequential order to supply additional heat to said enclosure and operable in a second position to reverse the sequence of switch operations, whereby said first and second thermostatic switches act to reverse the direction of rotation of said cam to constantly effect a fifty percent demand cycle regardless of weather conditions.

3. In an automatic heating and cooling system for an enclosure having at least one independently energized auxiliary heater positioned within said enclosure, an enclosed, reversible, heat pump refrigeration circuit including an indoor coil, an outdoor coil, a compressor and a four-way valve for reversing the flow of refrigerant to said coils, a control system comprising: a plurality of switches for operating said heat pump and said heaters, means tending to constantly energize and de-energize said switches in a sequential manner with a substantially constant time lag for each switch, respectively, independently of the temperature ambient said energizing and de-energizing means, thermostatic means located within said enclosure for initiating operation of said energizing and de-energizing means associated with said switches whereby energization of said switches first initiates a heating cycle within said heat pump and subsequently energizes said independently operable heater in a predetermined sequential order, while de-energization of said switches initiates a cooling cycle within said heat pump, said thermostatic means constantly operating to energize and de-energize said switches to effect a fifty percent demand cycle regardless of weather conditions.

4. In an automatic heating and cooling system for an enclosure having a plurality of independently energized auxiliary heaters positioned within said enclosure, an enclosed reversible heat pump refrigeration circuit including an indoor coil, an outdoor coil, a compressor, and a four-way valve for reversing the flow of refrigerant to said coils, a control system comprising: a rotatable cam, means tending to drive said cam at a constant speed in either of two rotational directions, a plurality of switches positioned adjacent said cam for sequential operation to operate said heat pump and said heaters, thermostatic means located within said enclosure for controlling the direction of rotation of said cam, said cam rotating in a first direction to initiate a cooling cycle within said heat pump, and in a second direction to first initiate a heating cycle within said heat pump and subsequently to energize said independently operable auxiliary heaters in a predetermined sequential order, said thermostatic means acting to constantly reverse the direction of rotation of said cam to effect a partial demand cycle regardless of weather conditions, a defrost relay, a normally open defrost initiation switch, a normally closed defrost termination switch, said defrost initiation switch being closed by accumulation of frost to energize said defrost relay, whereby operation of said defrost relay acts to reverse the position of said four-way valve to effect a cooling operation within said heat pump regardless of said thermostatic means and to energize any remaining un-energized auxiliary heaters regardless of the position of said cam until said defrost termination switch opens to de-energize said defrost relay.

5. An automatic heating and cooling system for an enclosure having a plurality of independently energized auxiliary heaters positioned within said enclosure and a closed reversible heat pump refrigeration circuit including an indoor coil, an outdoor coil, a compressor and a four-way valve for reversing the flow of refrigerant to said coils, indoor and outdoor blowers associated with said coils, said control system comprising: a rotatable cam, means tending to drive said cam constantly in either of two directions, a plurality of switches positioned adjacent said cam for sequential operation to operate said heat pump and said heaters, thermostatic means located within said enclosure for controlling the direction of rotation of said cam, said cam rotating in a first direction to initiate a cooling cycle within said heat pump and in a second direction to first initiate a heating cycle within said heat pump and subsequently to energize said independently operable heaters in a predetermined sequential order, said thermostatic means constantly reversing the direction of rotation of said cam to effect a partial demand cycle regardless of weather conditions, a normally open defrost initiation switch, and a normally closed defrost termination switch, said defrost initiation switch when closed, acting to de-energize the outdoor blower and to reverse the position of said four-way valve to effect a cooling operation within said heat pump regardless of the position of said thermostatic means, said defrost initiation switch also acting to energize any remaining un-energized auxiliary heaters regardless of the position of said cam until said defrost termination switch opens to terminate the defrost cycle, said defrost termination switch being responsive to temperature changes in the outdoor coil.

6. In an automatic temperature control system for an enclosure heated by a plurality of independent radiators operated by associated on-off switches, an improved control comprising a cam, a reversible clock motor driving the cam at a constant speed in either of two rotational directions independently of the temperature ambient the cam, the switches being disposed circumferentially adjacent the cam and sequentially actuated thereby, and a thermostat in the enclosure operable in a first circuit to energize the motor in response to a heat demand thus rotating the cam in a first direction and sequentially actuating the switches until the heat demand is satisfied by the radiators associated with the actuated switches, the thermostat operable in a second circuit to reverse automatically the direction of rotation of the motor and the cam to deactuate sequentially the switches and thus de-energize the associated radiators, said cam continuing to rotate in the reverse direction until the thermostat again registers a demand for heat.

7. In an automatic heating and cooling system for an enclosure having a plurality of independently energized auxiliary heaters positioned within said enclosure and a closed, reversible, heat pump refrigeration circuit including an indoor coil, an outdoor coil, a compressor, and a four-way valve for reversing the flow of refrigerant to said coils, a control system comprising: a rotatable cam, means tending to drive said cam at a constant speed in either of two rotational directions, a plurality of switches positioned adjacent said cam for sequential mechanical operation by abutment with said cam to operate said heat pump and said heaters, thermostatic means located within said enclosure for controlling the direction of rotation of said cam, said cam rotating in a first direction to initiate a cooling cycle within said heat pump, and in a second direction to first initiate a heating cycle within said heat pump and subsequently to energize said independently operable heaters in a predetermined sequential order, said thermostatic means acting to constantly reverse the direction of rotation of said cam to effect a partial demand cycle regardless of weather conditions, a defrost relay, a defrost initiation switch for energizing said relay and a defrost termination switch for deenergizing said relay, said defrost initiation switch being closed upon accumulation of frost on said outdoor coil to energize said relay whereby said relay acts to reverse the position of said four-way valve to effect a cooling operation within said heat pump regardless of the position of said thermostatic means and acts to energize any remaining unenergized auxiliary heaters regardless of the position of said cam until said defrost termination switch opens to deenergize said defrost relay.

8. In an automatic heating and cooling system for an enclosure having at least one independently energized auxiliary heater positioned within said enclosure and a closed, reversible, heat pump refrigeration circuit including an indoor coil, an outdoor coil, a compressor and a four-way valve for reversing the flow of refrigerant to said coils, a control system comprising: a rotatable cam, a reversible motor to alternately drive said cam at a constant speed in either of two rotational directions, a plurality of switches positioned adjacent said cam for sequential operation to operate said heat pump and said heater, thermostatic means located within said enclosure and electrically associated with said motor for controlling the direction of rotation of said cam, said cam rotating in a first direction to initiate a cooling cycle within said heat pump, and in a second direction to first initiate a heating cycle within said heat pump and subsequently to energize said independently operable heaters in a predetermined sequential order, said thermostatic means acting to constantly reverse the direction of rotation of said cam to effect a partial demand cycle regardless of weather conditions, defrost initiation means for reversing the position of said four-way valve to effect a cooling operation within said heat pump upon accumulation of a predetermined amount of frost on said outdoor coil regardless of the position of said thermostatic means, and separate defrost termination means to terminate the operation of said defrost initiation means when said defrost initiation means have operated for a period of time sufficient to remove said accumulation of frost.

9. Apparatus as claimed in claim 8 further including auxiliary heat supply means operable in conjunction with said defrost initiation means to energize any remaining unenergized auxiliary heaters regardless of the position of said cam, said auxiliary heat supply means being operable only during the defrosting period.

References Cited in the file of this patent

UNITED STATES PATENTS

| | | |
|---|---|---|
| 2,672,734 | Ditzler et al. | Mar. 23, 1954 |
| 2,806,674 | Biehn | Sept. 17, 1957 |
| 2,865,610 | Sparrow | Dec. 23, 1958 |
| 2,902,220 | Myck et al. | Sept. 1, 1959 |